United States Patent

Clay

[15] 3,674,887
[45] July 4, 1972

[54] OXIDATIVE DEHYDROGENATION PROCESS

[72] Inventor: Harris A. Clay, Bartlesville, Okla.

[73] Assignee: Phillips Petroleum Company

[22] Filed: Dec. 24, 1970

[21] Appl. No.: 101,277

[52] U.S. Cl.....................................260/680 E, 260/681.5 R
[51] Int. Cl............................................................C07c 5/18
[58] Field of Search ..............................260/680 E, 681.5 R

[56] References Cited

UNITED STATES PATENTS

| | | | |
|---|---|---|---|
| 3,278,625 | 10/1966 | Dancer et al. | 260/680 |
| 3,336,414 | 8/1967 | Woerner | 260/681.5 |
| 3,412,171 | 11/1968 | Welch et al. | 260/681.5 |
| 3,468,969 | 9/1969 | Woerner | 260/680 |
| 3,536,775 | 10/1970 | Hutson et al. | 260/681.5 |

*Primary Examiner*—Paul M. Coughlan, Jr.
*Attorney*—Young & Quigg

[57] ABSTRACT

Impurities introduced during the oxidative dehydrogenation of paraffin or olefin hydrocarbons are removed from the olefin product using water and caustic scrubbing. The olefin product while absorbed in an oil is scrubbed with the caustic solution.

9 Claims, 2 Drawing Figures

INVENTOR.
H. A. CLAY

BY Young & Quigg

ATTORNEYS

INVENTOR.
H. A. CLAY

BY Young & Quigg

ATTORNEYS

OXIDATIVE DEHYDROGENATION PROCESS

BACKGROUND OF THE INVENTION

1. Field of the Invention

This invention relates to the oxidative dehydrogenation process. It further relates to the removal of impurities introduced into the olefin product during the oxidative dehydrogenation process.

2. Description of the Prior Art

The oxidative dehydrogenation process for the conversion of paraffins or monoolefinic hydrocarbons (e.g., butane or butenes) to polymerizable monomers (e.g., butadiene) has recently been perfected. The process encompasses the dehydrogenation of the feed hydrocarbon in the presence of a suitable catalyst, air or other oxygen-containing gas, and preferably steam. While increasing conversion of the feed to the diolefin, the process has also resulted in substantial amounts of carbonyl impurities such as organic acids, ketones, aldehydes, alcohols and other impurities such as acetylenes, CO, $CO_2$, $N_2$ and $O_2$ within the dehydrogenation reactor effluent. The impurities must be efficiently removed to render the product suitable for various commercial applications (polymerization), to reduce corrosion of plant equipment and eliminate fouling of reactors, lines, strippers, and the like.

Removal of impurities in a manner which conserves valuable treating agents and which contributes to control of processing variables is difficult to achieve.

OBJECTS OF THE INVENTION

It is an object of this invention to efficiently remove undesirable impurities which are produced in an oxidative dehydrogenation process. Other objects and advantages of the invention will be apparent from the following summary of the invention, detailed description of the invention and the claims.

SUMMARY OF THE INVENTION

I have discovered a method of efficiently removing impurities from an oxidative dehydrogenation reactor effluent. The effluent is suitably cooled. Subsequently, the cooled effluent is treated with mineral oil to absorb the hydrocarbons contained in the reactor effluent. The rich oil is then separately scrubbed with water or sodium sulfite solution and caustic solution which removes substantially all of the impurities. In the last step of my process, the rich oil is stripped in the presence of suitable polymerization inhibitor solution.

In a further embodiment of my invention, the impurities are removed from the oxidative dehydrogenation process wherein a compressor is used on the vaporous reactor effluent. Accordingly, the vaporous reactor effluent is cooled and then washed with water or sodium sulfite solution in a vapor-liquid contacting device prior to compression. This step removes substantial amounts of water soluble impurities which would increase the chances for explosion during compression. Subsequent to compression, the compressor effluent is absorbed in mineral oil, scrubbed with caustic solution, and the rich oil is then stripped in the presence of a suitable polymerization inhibitor solution.

DETAILED DESCRIPTION OF THE INVENTION

The impurities which are efficiently removed using the process of the invention include carbonyl compounds which are defined as any compound containing a (>C = O) group, and includes organic acids, aldehydes, and ketones. Exemplary carbonyl compounds are furan, furfural, acetaldehydes, acetic acid, methylacetate, acrolein, and the like. Other impurities which are efficiently removed include low boiling acetylenes and gaseous contaminants such as $CO_2$, CO, $N_2$ and $O_2$.

Figure 1:
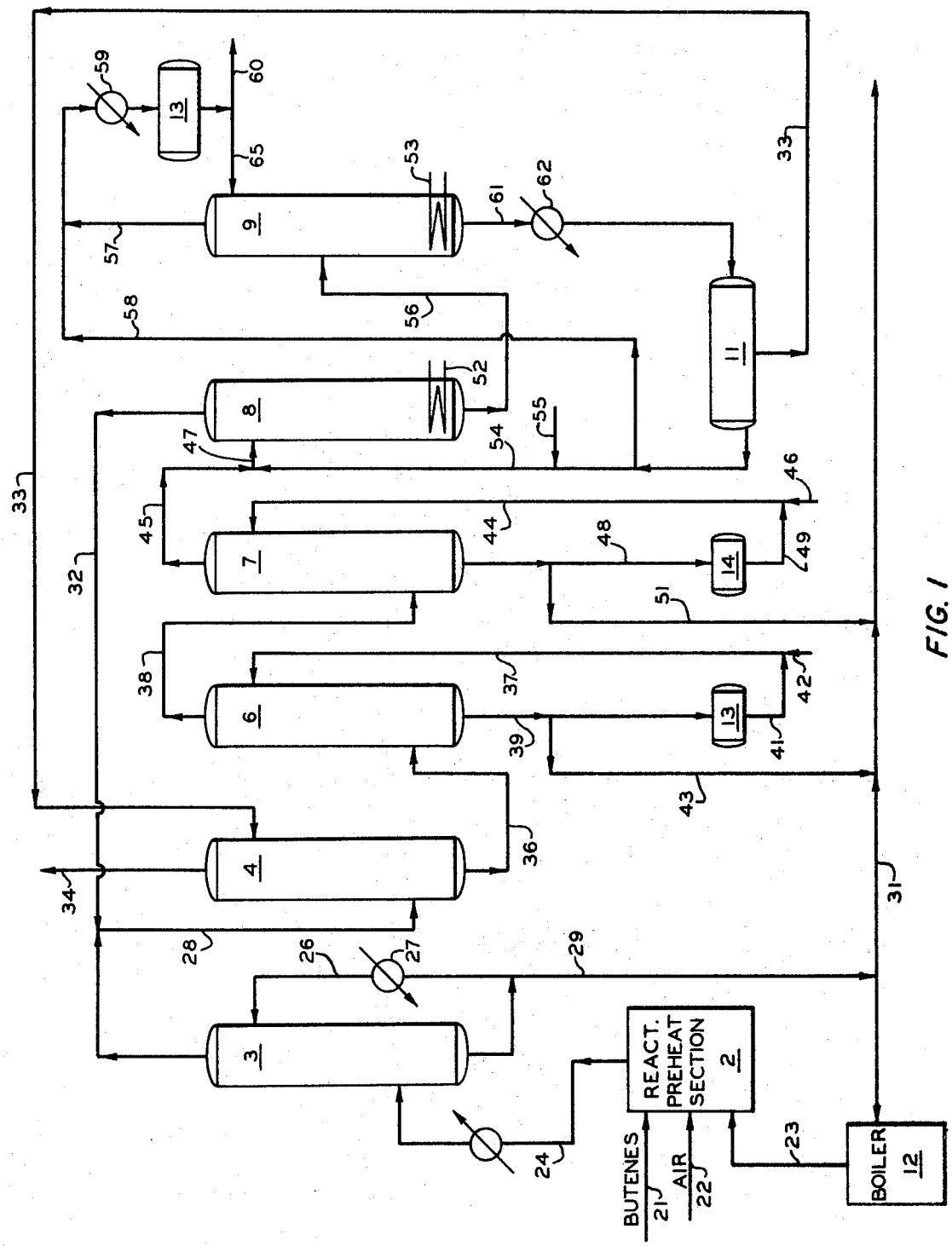
FIG. 1 of the drawings is a schematic flow diagram of the process of the invention where compression is not employed on the dehydrogenation reactor effluent.

The process of the invention can best be understood with reference to the drawings. FIG. 1 schematically illustrates the preferred process of the invention. The major components of the system are an oxidative dehydrogenation reactor-preheat section 2, water quench column 3, mineral oil absorber 4, water wash column 6, caustic wash column 7, rich oil strippers 8 and 9, and sodium nitrite accumulator-separator 11. For the purposes of illustrating the process of the invention, the oxidative dehydrogenation process of butenes to produce butadiene is employed. However, it is clear that the process is not limited thereto, and other paraffins or monoolefins could be employed as feed to the reactor-preheat section. For example, isoamylenes can be similarly dehydrogenated to produce isoprene, or butene can be dehydrogenated to produce butenes and butadiene.

The reactor-preheat section 2 receives feed butenes, air and steam via lines 21, 22, and 23 respectively. The oxidative dehydrogenation of the butenes produces an effluent stream 24 at a temperature of about 1,125° F. and a pressure of about 38 psia. Stream 24 comprises steam, butadiene, butenes, butane, acetylenes (e.g., vinyl acetylene), other hydrocarbons, organic acids, aldehydes, ketones, other oxygenated compounds, $CO_2$, CO, $N_2$, and $O_2$. Stream 24 is cooled to about 400° F. by passage through a reboiler wherein the hot gaseous effluent transfers considerable heat to a recycle water stream, thereby generating process steam. Stream 24 now at a temperature of about 400° F. is passed to water quench column 3 wherein it is additionally cooled by direct contact with cold water introduced into column 3 via line 26 after passing through cooler 27. The vaporous hydrocarbon stream is thus cooled to 240° F., withdrawn overhead by line 28 and passed through an air cooler (not shown) wherein it is cooled to about 125° F. Cooling the stream to 125° F. causes condensation of much of the steam, the condensate being removed by simple phase separation (not shown). The resulting gaseous hydrocarbon stream is then introduced into mineral oil absorber 4 via line 28. Water is removed from column 3 in line 29 and passed to boiler 12 for generation of additional steam. A certain amount of the water in line 29 is returned to column 3 via line 26.

The water quench of the reactor effluent stream removes about 90 percent of the soluble impurities (e.g., ketones, aldehydes, alcohols, and the like). Recycle of these impurities in the water recycled via line 29 to boiler 12 and thence to reactor 2 acts to suppress the formation of additional such impurities. To prevent undesirable accumulation of the soluble impurities in the reactor-preheat and water quench column loop, however, about 10 percent of the water is removed from the recycle stream 29 via line 31 as waste water.

Mineral oil absorber 4 receives stream 28 containing the quenched reactor effluent plus recycle materials from the mineral oil stripping section by way of line 32. The mineral oil used can be any suitable oil having the ability to absorb the hydrocarbon components of stream 28, e.g., butylenes, butanes, butadiene, and other hydrocarbons while rejecting gases such as nitrogen, oxygen, $CO_2$, CO, and the like. Preferably, the mineral oil employed is a $C_5$ to $C_8$ paraffinic fraction having a boiling range of from about 75° to about 200° F. The lean oil is introduced to absorber 4 by way of line 33. The absorber is operated at a suitable temperature and pressure to insure absorption of the hydrocarbons and venting of light gases. For example, a temperature of about 100° F. and pressure of about 30 psia can be employed. The gases exit the column via line 34 and are passed to a flare. These gases include, for example, nitrogen, CO, oxygen, methane, ethylene, and $CO_2$.

Rich oil is removed from absorber 4 and passed to water wash column 6 via line 36. In column 6, the rich oil is countercurrently contacted with water or a sodium sulfite solution to scrub out carbonyls and other water soluble impurities. The water or salt solution is introduced to column 6 via line 37. The treated oil is removed from column 6 and passed to caustic wash column 7 via line 38. Water or salt solution containing the impurities is removed from column 6 via line 39 and passed to accumulator 13. Water is recycled to the column from accumulator 13 via line 41 which joins line 37. Makeup water or salt solution is introduced in line 42 to line 37 or 41. To prevent accumulation of water soluble impurities in the water wash column recycle loop, line 43 is provided from line 39 to line 31 for intermediate or continuous discharge from the system.

To effect additional removal of carbonyl impurities the rich oil is then treated with caustic solution in column 7. This treatment is very effective in removing acid impurities from the system, especially organic acids such as acetic acid, and inorganic acids such as carbonic acid. Caustic solution is introduced to column 7 via line 44. Treated rich oil is removed overhead by line 45 and passed to the absorber stripping column via line 47. Caustic solution containing the impurities is removed by line 48, passed to accumulator 14, and recycled to the column via line 49 which joins line 44. Makeup caustic solution is introduced to line 44 via line 46. As was the case in the water wash section, caustic solution can intermittently or continuously be removed from the system using line 51 which connects line 48 to waste disposal line 31. The amount of caustic solution required will be an amount sufficient to remove as much of the carbonyl impurities as possible. The strength of caustic (NaOH) solution employed can vary over a wide range. Suitable solutions include 2 to 25 weight percent concentrations of NaOH in water. Preferably, the strength of the solution is about 10 weight percent. Sodium carbonate and/or sodium sulfite solutions can replace the whole or a part of the NaOH in the above solutions.

The advantages of the process of the invention as described above are best explained at this point. The carbonyl and other impurities contained in the oxidative dehydrogenation reactor effluent are highly corrosive materials. This is especially true of oxygen and oxygen-containing compounds. In removing the gaseous and the gaseous components from the effluent, mineral oil absorption is the preferred method of operation. However, stripping the hydrocarbon products from rich oil requires relative large amounts of reboiler heat which must be transferred in heat exchangers requiring a very large surface area. If the carbonyls are present in the rich oil, the heat exchanger surface must be of stainless steel construction, which is prohibitively expensive. By removing the carbonyls prior to the stripping step, the corrosion problem is avoided and ordinary steel exchangers may be used. In addition, the carbonyls tend to polymerize when heated and form polymer which plates out on heat exchangers, in pumps, on contacting trays, and the like, thus fouling the apparatus and reducing efficiency. Thus, the process of the invention minimizes corrosion, prevents polymerization, and contributes to the efficient operation of the overall dehydrogenation process.

The rich oil is then treated in a two column stripper operation in columns 8 and 9. Both these columns have suitable heat providing means 52 and 53 respectively. Rich oil enters column 8 via line 47. Prior to introduction into the column, the rich oil is admixed with a suitable polymerization inhibitor such as aqueous sodium nitrite solution from line 54. Column 8 is operated at a temperature which is just sufficient to provide final removal of trace amounts of light gases such as oxygen, nitrogen, CO, and $CO_2$ and the like in line 32 to line 28. The degased oil is then passed from column 8 via line 56 to column 9. Column 9 is operated at a temperature sufficient to remove the light hydrocarbon fraction from the oil fraction, e.g., a bottom temperature of 360° F. and a pressure of 95 psia. The hydrocarbon fraction containing butenes and butadienes is taken overhead in line 57, admixed with aqueous inhibitor solution from line 58, condensed in condenser 59, located in line 57, and accumulated in reflux-accumulator tank 13. From tank 13, the hydrocarbon-aqueous inhibitor solution is refluxed to column 9 via line 65 and product butadiene and unconverted butenes are removed via line 60.

A lean oil-aqueous inhibitor solution mixture is removed from column 9 via line 61, cooled in cooler 62 located in line 61, and passed into accumulator-separator 11 wherein it separates into a water phase and an oil phase. Aqueous inhibitor solution is removed via line 58 for return to line 57. Lean oil is removed by line 33 for return to column 4. Makeup inhibitor solution is introduced by line 55 into line 54. It is sometimes desirable to use a heavier molecular weight oil in the process, for example a gas oil having a boiling range of from about 150° to about 500° F. When such an oil is used, it is generally undesirable to remove the aqueous inhibitor solution from the bottom of column 9 due to the problem of precipitating the inhibitor in the column reboiler. Thus the inhibitor solution can be effectively removed from column 8 in which case accumulator-separator 11 would be located in line 56 rather than line 61.

Figure 2:
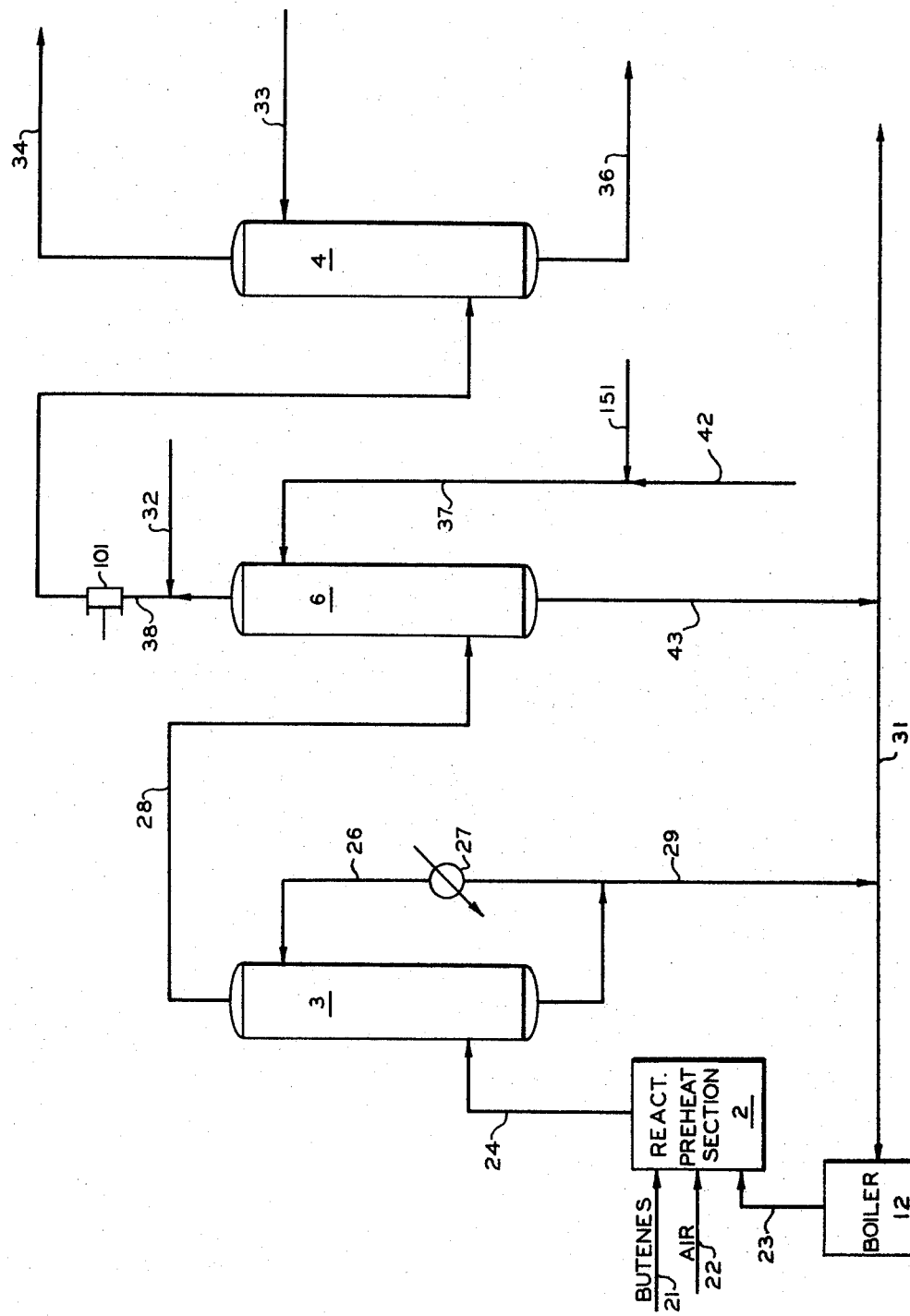
FIG. 2 of the drawings is a schematic flow diagram of the process of the invention which illustrates the embodiment of the invention wherein compression is employed on the oxidative dehydrogenation reactor effluent.

A further embodiment of the process is demonstrated in FIG. 2 wherein the reactor effluent is compressed prior to the separation steps. Accordingly, it becomes necessary to reduce the concentration of troublesome components of the reactor effluent to a minimal level prior to compression. The embodiment of the invention as depicted in FIG. 2, uses the reference numbers corresponding to the same apparatus used in FIG. 1. Different equipment is designated by numbers greater than 100.

As can be seen, the reactor-preheat section 2, the input and output lines thereto, water quench column 3, and the input and outlets therefrom, are identical to that explained in FIG. 1 above. However, instead of the overhead from column 3 in line 28 being passed to mineral oil absorber column 4, it is immediately subjected to water treatment in column 6. Water is introduced to column 6 from line 42 and includes recycle water from caustic wash column 8 in line 48 (See FIG. 1) by way of line 151 which connects line 42 with line 48.

The overhead from column 6 in line 38 is subjected to compression by compressor 101 in line 38. The compressed effluent is then passed to mineral oil absorber column 4. The rich oil from column 6 is then passed caustic wash column 7 via line 36. The system of FIG. 2 thus efficiently removes organic oxygen-containing materials which could cause fouling and corrosion when undergoing compression. Thus, the process of FIG. 2 accomplishes carbonyl and other impurities removal by water washing and caustic washing in a manner which contributes to the safety of plant operation by minimizing the potential hazard of failure of equipment due to corrosion.

Using either of the embodiments of the invention discussed above, the MSO stripper overhead will concentrate traces of oxygen in the product in line 60. Therefore, it is advantageous to remove these final traces of oxygen using a suitable oxygen scavenger. This can be efficiently done by subjecting product stream 60 to a treatment with the scavenger material in a simple contacting column (not shown), preferably in the liquid phase. Suitable scavenger materials include sodium sulfite, sodium nitrite, alkaline pyrogallol, and the like.

For the sake of simplicity, a minimum number of operating variables of the process have been set forth above to illustrate the best mode of the invention. It is well known in the art that process conditions can be optimized to accomplish the purification and separation steps of this invention. The size of the plant will determine many of these operating conditions, as well as reaction efficiencies in the main process reactor. In the production of butadiene by oxidative dehydrogenation of butenes, the amount of materials present in the reactor effluent will be the following approximate weight percent of the total effluent: steam 77 percent, butadiene 5 percent, butylenes 2 percent, butane 1.5 percent, $CO_2$ 0.2 percent, CO 0.2 percent, $N_2$ 11 percent, and $O_2$ 1.4 percent; other hydrocarbons such as methane, ethane, ethylene, propane and the like 1.0 percent; carbonyls such as aldehydes, ketones, alcohols, and the like 0.25 percent; and acetylenes 0.05 percent.

Following treatment of the effluent in accordance with the process of the invention, the product in line 60 will have the following composition (i.e., wt. % of total product): butadiene 54, butylenes 25, butanes 16, and acetylenes 0.04 percent, and other hydrocarbon as ethylene propylene, and the like 5 percent.

Reasonable variations and modifications of the above-described invention is possible without departing from the spirit and scope thereof. For the sake of simplicity, certain pumps, valves, automatic controls, and various other equipment has been omitted from the FIGURES of the drawing, although in actual operation, these may be required to operate the process. These design details are easily within the skill of one in the art.

I claim:

1. In a process of oxidatively dehydrogenating paraffin or monoolefin hydrocarbons to diolefin hydrocarbons in the presence of steam, the improvement comprising removing impurities from the effluent stream of the reactor which comprises the steps of
   a. absorbing the hydrocarbon fraction of the effluent in an oil to provide a rich oil, thereafter
   b. washing the rich oil with water or sodium sulfite solution, thus removing water soluble impurities from the rich oil, thereafter
   c. scrubbing the washed rich oil with caustic solution thus removing impurities which are neutralized by the caustic solution and those impurities which are soluble in the caustic solution, and thereafter
   d. stripping the rich oil of those hydrocarbons which were absorbed in step (a).

2. The process of claim 1 wherein prior to step (a) the effluent stream is quenched by direct contact with water.

3. The process of claim 1 wherein the impurities which are removed from the effluent stream comprise carbonyl compounds which are hydrocarbon compounds having a $>C=O$ group, $CO$, $CO_2$, $N_2$ or $O_2$.

4. The process of claim 1 wherein said process is one wherein butenes are oxidatively dehydrogenated to butadiene in the presence of steam.

5. The process of claim 4 wherein said oil is $C_5-C_8$ paraffin fraction having a boiling point in the range of from about 75° to about 200° F.

6. In a process of oxidatively dehydrogenating paraffin or monoolefin hydrocarbons to diolefin hydrocarbons in the presence of steam, the improvement comprising removing impurities from the hot effluent stream of the reactor which comprises the steps of
   a. quenching the effluent stream to a temperature which is sufficient to maintain the effluent stream in the vapor phase, thereafter
   b. washing the vaporous effluent stream with water thus removing the water soluble impurities which are soluble therein, thereafter
   c. compressing the vaporous water washed stream from step (b), thereafter
   d. absorbing the hydrocarbons contained in the compressed stream in an oil to provide a rich oil, thereafter
   e. scrubbing the rich oil with caustic solution thus removing the impurities which are neutralized by the caustic solution and are soluble in the caustic solution, and thereafter
   f. stripping the hydrocarbons absorbed in step (d) from the rich oil.

7. The process of claim 6 wherein in step (a) the effluent stream is quenched by direct contact with water.

8. The process of claim 6 wherein said process is one wherein butenes are oxidatively dehydrogenated to butadiene in the presence of steam.

9. The process of claim 8 wherein said oil is $C_5-C_8$ paraffin fraction having a boiling point in the range of from about 75° to about 200° F.

* * * * *